Sept. 5, 1961 R. P. LAPPALA 2,999,041

REINFORCED TEAR-RESISTANT MATERIAL

Filed Feb. 4, 1957

INVENTOR.
RISTO P. LAPPALA
BY
John L. Diehl
Attorney 2,999,041
Patented Sept. 5, 1961

2,999,041
REINFORCED TEAR-RESISTANT MATERIAL
Risto P. Lappala, Madison, Wis., assignor, by mesne assignments, to Griffolyn Company, Inc., Madison, Wis., a corporation of Delaware
Filed Feb. 4, 1957, Ser. No. 637,983
3 Claims. (Cl. 154—46)

This invention relates to a material comprising two sheets of flexible synthetic resin having therebetween a layer of an elastomeric foam and a grid of fibrous strands which provides tear resistance.

This application is a continuation-in-part of my co-pending application Serial No. 367,317, filed July 10, 1953, now abandoned.

A superior sheet material is desirable which may be used as a material suitable for tops for "convertible" automobiles, insulating material, sound-proofing material and construction material. The material should be extremely light but extremely strong and should be tear-resistant and weather-resistant. It should have a very high tensile and bursting strength per unit weight. Conventional materials prepared heretofore have not had the aforementioned properties. It is also necessary or desirable that such material be tear-resistant so that when a tear or rip is started in the material by puncturing or by snipping with scissors, the tear does not propagate or at least does not propagate easily across the material.

It has been desirable to provide a material having greater strength per unit weight and greater durability. A material having these properties would be especially suitable for convertible tops. Due to its thermal and acoustical insulating properties, it may be very suitable as a material for air-supported buildings. This invention provides a superior material which has high strength per unit weight and very great tear resistance and which also has higher heat resistance than materials used heretofore and also much greater resistance to incidental damage which may be caused by friction, sharp articles, abrasion, etc. It differs from materials which have previously been prepared and which appear visually quite similar in its tear resistance and its mode of construction as will be set forth hereinafter more specifically. This material is also weather resistant. The material may also be extremely good for convertible tops. The present material used in convertible tops is unsuitable due to flapping of the material when the car is in motion or when the car is exposed to wind.

An object of the invention is therefore to provide a material which has great strength per unit weight and which has great tear resistance, great resistance to weather and great resistance to incidental abrasive and puncturing influences.

Another object is such a material which may be made more easily and economically than by weaving.

Another object is such a material which comprises continuous synthetic resin sheets.

Another object is a flexible tear-resistant material having high resistance to flapping when exposed to wind and thereby suitable for roofs of "convertible" automobiles.

Another object is a thermal and acoustical insulating material.

Further objects will become apparent from the drawings and the following detailed description in which it is my invention to set forth the applicability of the invention without thereby intending to limit its scope to less than that of all those equivalents which will be apparent to those skilled in the art and in which like reference numerals refer to like parts and in which.

Figure 1:
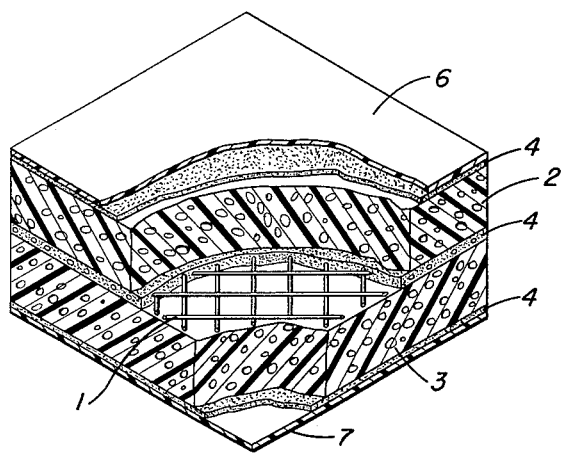
FIGURE 1 is a perspective view of a small portion of a sheet according to the invention.

According to a preferred embodiment of the invention, as shown in FIGURE 1, a grid or screen of strands 1 is provided. Sheets 2 and 3 of an elastomeric foam are then secured to each side of said grid with a tacky adhesive 4, which is adapted to remain tacky substantially permanently and not to harden to either flexible, rubbery or rigid form. Sheets 6 and 7 of thin foldable flexible synthetic resin as described below are secured to each side of said foam with tacky adhesive 4.

Figure 2:
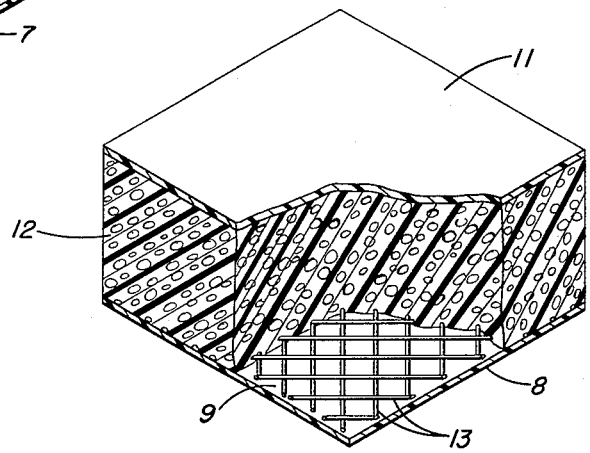
FIGURE 2 is a perspective view of another embodiment of the invention.

The strands are preferably either multifilamentary twisted strands 13 as shown in FIGURE 2 or multifilamentary roving (usually containing from ½ to 1 turn per inch and thus being only slightly twisted although generally referred to as untwisted) (twist may be from ½ turn per foot to about 4 turns per inch). Monofilamentary yarns are generally not preferred due to low resistance to repeated sharp bendings and have generally been found to be generally unsuitable for the invention. Strands of either natural organic materials or synthetic organic materials may be utilized, the latter being preferred. Strands of modified natural material such as strands coated or impregnated with a cellulose polymer or synthetic resin may also be used; likewise strands of several types may be used in the same sheet of material.

Natural yarns which may be used for strands include cotton, hemp, jute and wool.

Synthetic yarns which may be used include viscose rayon, acetate rayon, polyvinyl chloride, polyvinylidene chloride, co-polymers of polyvinyl and polyvinylidene chloride, co-polymers of vinyl chloride and vinyl acetate, polystyrenes, polyethylenes, polyamides, polyacrylonitriles, polyesters, cyanoethylated cotton, cellulose acetate and cellulose acetate butyrate.

Preferred materials for strands thus include multifilamentary organic materials such as polyamides (nylon), polyesters (Dacron and Terylene) polyacrylonitriles (Orlon), and cyanoethylated cotton (Fortisan) generally in the form of roving having a twist of from ½ turn per foot to 4 turns per inch. Multifilamentary glass strands, preferably of roving as above, may also be used.

Any suitable diameter or weight of yarn may be used, preferred weights being in the range of about 500 to 2400 denier.

The grid of strands may be rectilinear in form, as shown in FIGURE 1, or may have any other suitable pattern.

The grid or screen of strands of yarn is preferably non-woven. A non-woven grid is preferable in order to provide tear resistance.

The material, when torn, undergoes a characteristic action. The strands 1 of the grid slide in the adhesive 4, and instead of breaking, pile up on one another so that as the tear propagates in the synthetic resin films, more and more strands become stressed, each sliding longitudinally and sideways through the adhesive, until the tear is stopped by virtue of a veritable rope formed by a plurality of strands extending across the tear substantially normal to the line of propagation of the tear itself. The ending of tearing action may result when the strength of one man is insufficient to produce further tearing action.

This characteristic of the material is critical to the invention.

As shown in FIGURE 2, sheet 8 having arranged on surface 9 a grid or screen of unwoven strands 13 and sheet 11 are secured to each other by means of an elastomeric foam 12 which may be produced in situ or may be cut from a block of previously prepared block of foam and then included in the structure. Both sheet 8 and sheet 11 consist of a flexible synthetic resin as described below.

Figure 3:
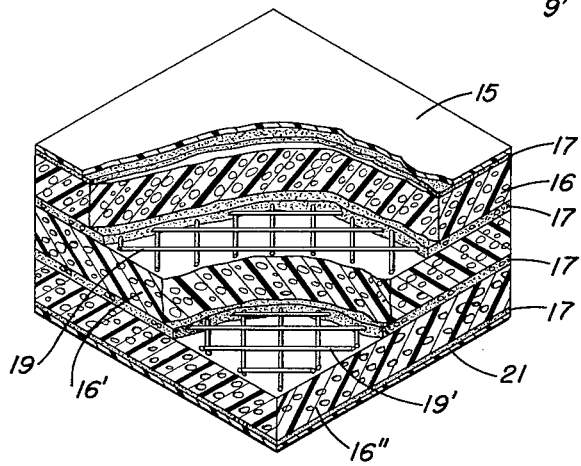
FIGURE 3 is a perspective view of another embodiment of the invention.

As shown in FIGURE 3, tear-resistant material 14 may be made from organic synthetic resinous films, elastomeric foam, grids of multifilamentary roving and a tacky adhesive. An organic synthetic resinous film 15 is adhesively attached with a tacky adhesive 17 to a sheet of elastomeric foam 16. Below sheet 16 is adhesively attached with a tacky adhesive 17 another sheet of elastomeric foam 16'; sheets 16 and 16' having embedded therein between a grid of unwoven multifilamentary roving 19. Another sheet 16" of elastomeric foam is adhesively attached with tacky adhesive 17 to sheet 16' and has embedded therein between a grid of unwoven multifilamentary roving 19'. Sheet 16" of elastomeric foam is adhesively attached with a tacky adhesive 17 to a film 21 of synthetic organic resinous material.

We prefer an elastomeric foam for the invention because of its excellent crease resistance, flexibility, pliability, and softness. Thermoset resins, after being creased or folded once, have the tendency to always crease in the same place. After creasing two or three times, the thermoset resin cracks; thus it is highly unsatisfactory.

The two sheets, one on each side of the grid, may be of the same synthetic resin or may be of different synthetic resins. It is preferable, but not necessary, that at least one of the films be a transparent flexible polyester synthetic resin and a preferred material for such film is a polyester formed by the condensation of ethylene glycol and terephthalic acid which is sold commercially as Mylar or Terylene. A preferable polyester film is one in which the polymer molecules have been oriented after formation of the film to provide great tensile and flexural strength.

The second film may be a similar polyester synthetic resin or may be another synthetic resin adapted to contribute other properties to the material such as feel, and so forth. The organic synthetic resinous material may be selected from the following group:

Polyethylene
Plasticized or unplasticized films of polyvinyl chloride or polyvinyl acetate or polyvinylidene chloride or copolymers of two or more of these; chlorinated polyethylene
Chlorosulphonated polyethylene
Polytetrafluoroethylene
Polychlorotrifluoroethylene
Other halogenated polyethylenes
Polyamides
Polyvinyl alcohol
Regenerated cellulose
Cellulose esters such as cellulose acetate
Cellulose ethers such as ethyl cellulose It is critical to the invention that the films be non-fibrous and non-porous and non-bibulous in order to allow the strands to slip and slide easily through the adhesive when the material is torn and to thus provide the desired tear resistance. Material of a bibulous and fibrous nature, such as paper and the like, is generally unsuitable. Such material of a fibrous nature, generally including paper of all types such as kraft, glassine, bond and the like generally exhibits the disadvantage that the crease resistance of the best of such materials as represented by the ability to withstand repeated folding is very low as compared to a film of comparable thickness of synthetic resin or like material. It has the further disadvantage that a rip propagates in a direction controlled by the grain of the paper causing significant reduction in tear resistance.

Suitable results are obtained only if such films are less than .015 inch thick and preferred results are obtained with films of thicknesses of from about .25 mil or .5 mil up to 4 mils and in any event less than 10 mils, i.e., .010 inch. Such films are not only flexible but are also characterized by being readily foldable, that is, they may be folded repeatedly in the same place without thereby being damaged or caused to take a permanent set. Such films as hereinbefore mentioned fulfill these requirements, whereas no paper or other fibrous material is known which in any way exhibits any such properties.

Preferred films are characterized by a high elongation (greater than about 20% up to 400%) before tensile failure. The elongation of paper sheets is not known to exceed about 5% at most and is generally 1–3%.

The films are adhered together with an adhesive which is adapted to remain tacky or non-setting forever or for at least the life of the material which might reasonably be regarded as from 5 to 15 years.

In order to provide decorative effects or various colors, a number of practices may be followed: carbon-black may be added to an otherwise transparent adhesive to provide a black opaque sheet. A black opaque sheet may also be provided by utilizing an asphaltic or pitch compound as an adhesive. Coloring matter such as dyes or pigments may be added to an otherwise transparent or clear foamable adhesive. Decorative effects may also be provided by printing upon the inner surface of one of the transparent flexible synthetic resin films, if the material is to be used for structural material. It is also possible to include in the structure of the invention a sheet of a woven fabric such as canvas or cheese cloth or Holland cloth, such sheet being adhesively attached on top of either of the resin films, or between one of the resin films and the layer of resin foam, or embedded in the resin foam layer to provide desired decorative or structural properties but such embodiment is generally not preferred.

Various examples of the adhesive of the invention were prepared as shown in the following table:

| Adhesive Designation | Formulation |
|---|---|
| A | 100 parts synthetic Butyl rubber sold commercially as GRI-17 by Enjay.<br>33 parts mixture of two or more chlorinated biphenyls [1] (Aroclor 5460).<br>200 parts xylene. |
| B | 2 parts synthetic Butyl rubber sold commercially as GRI-25 by Enjay.<br>1 part mixture of two or more chlorinated biphenyls [1] (Aroclor 1262).<br>5 parts xylene. |
| C | 2 parts synthetic Butyl rubber sold commercially as GRI-15 by Enjay.<br>1 part mixture of two or more chlorinated biphenyls [1] (Aroclor 5460).<br>5 parts xylene. |
| D | 16 parts synthetic Butyl rubber sold commercially as GRI-17 by Enjay.<br>5 parts mixture of two or more chlorinated biphenyls [1] (Aroclor 5460).<br>40 parts kerosene fraction. |
| E | Blackstrap molasses. |
| F | Asphalt dissolved in hydrocarbon. |

[1] Mixture comprising two or more of the following chlorinated biphenyls: monochlorobiphenyl, dichlorobiphenyl, trichlorobiphenyl, tetrachlorobiphenyl, pentachlorobiphenyl, hexachlorobiphenyl, heptachlorobiphenyl, octachlorobiphenyl, nonachlorobiphenyl, decachlorobiphenyl.

Butyl (trademark, registered by Standard Oil Company of New Jersey), is an isobutylene-diolefin copolymer. It is a vulcanizable hydrocarbon rubber which is not readily attacked by oxygen, ozone, acid, alkalis and other chemical agents which are harmful to natural (Hevea) rubber. It has low unsaturation. The specific gravity of Butyl is 0.92. It is a solid elastic odorless non-toxic light colored hydrocarbon rubber. It is manufactured according to the specifications of the Reconstruction Finance Corporation office of Rubber Reserve, effective January 1, 1947, and revised April 1, 1947, March 15, 1948, and June 1, 1948.

The specification limits for GR–I are:

CHEMICAL PROPERTIES

| | |
|---|---|
| Volatile matter, percent max | 0.30 |
| Ash, percent max | 0.50 |
| Stabilizer, percent min | 0.10 |

VISCOSITY

Mooney plasticity (large rotor, 9 min. at 212° F.):
- Min. ——— 41
- Max. ——— 49

| Physical Properties at 82° F. | Cure at 307 F., Min. | | |
|---|---|---|---|
| | 20 | 40 | 80 |
| Tensile strength, p.s.i., min | 2,500 | 2,500 | 2,500 |
| Ultimate Elongation, percent, min | 650 | 650 | 650 |
| Modulus at 400% Elongation, p.s.i.: | | | |
| Min | 575 | 875 | 1,200 |
| Max | 775 | 1,125 | 1,500 |

GR–I–15 is similar to GR–I except that it contains a greater proportion of diolefin and, therefore, exhibits a faster rate of cure. The specifications for Mooney plasticity and chemical properties are the same as for GR–I. GR–I–25 is more unsaturated than GR–I–15 and, therefore, is faster curing. The specifications for Mooney plasticity and chemical properties are the same as for GR–I. GR–I–17 is believed to be between GR–I–15 and GR–I–25 with respect to proportion of diolefin and rate of cure.

Suitable results are obtained only if the adhesive is applied in the amount of ¼ ounce to 3 ounces per square yard of surface of the laminate and preferable results are obtained with amounts of from ½ ounce to 2 ounces per square yard; a layer of this very considerable thickness is necessary in order to provide the resistance to rips which characterizes the material.

As for the foam produced in situ, materials which are mixed immediately before application and foam at ordinary temperatures or heat activated foams may be used so long as the foams are elastomeric. Pre-foamed elastomeric materials may also be used.

Typical organic foaming agents which can be used include air or steam through inexpensive chemicals such as ammonium carbonate which decompose into gases or diazo compounds which generate nitrogen or to organic acid terminal groups which in the case of the isocyanates liberate carbon dioxide.

Some nitrogen generating foaming agents include diazoaminobenzene, dinitrosopentamethylene tetramine, the tin or zinc chloride salt of diazotized p-aminoethyl benzyl aniline, the zinc chloride salt of p-diazo diphenyl amine, the zinc chloride salt of diazotized 4-amino diethyl aniline. The aforementioned materials can be activated by means of ultraviolet light.

With regard to the percentage of foaming agent needed, a quantity adequate to give at least an amount of gas evolution equal to at least three times the volume of the adhesive. An amount of foaming agent in the order of ¼ to 10% of the adhesive is satisfactory, although in extreme cases up to 30% can be used.

The foams may either be in situ foams or may be pre-formed foams so long as the foams are elastomeric. The preferred foams of the invention incorporate preformed foams cut into slabs of appropriate thicknesses. When prefoamed materials are utilized, a tacky adhesive is incorporated between the film layers and foam and also between the grid or screen of strands and foam. If the foam exceeds a thickness of ¼ inch, care must be taken to provide an adequate number of grids or screens for reinforcement of the material. If the foam thickness is too great and does not have adequate reinforcement, there is a tendency of the foam to pull out from between the films.

Examples of elastomeric foams which can be used include polyurethane foams, sponge rubber and vinyl foam.

While only these foams have been described it should be understood that other foams can be utilized in this invention so long as the foam is flexible and elastomeric.

Polyurethane foams suitable for use in my invention may be prepared in the usual manner by reacting a polyester, diisocyanate and a water-bearing activator. Foams of this type are very economical, may be foamed in situ and offer excellent adhesion. Polyurethanes may also be prefoamed. They also require little to no heat for curing since the reaction is exothermic. There are a few disadvantages encountered while using this foam. For example, the diisocyanate used is semi-toxic and requires safety precautions. The density of the foam is varied by very slight changes in the recipes used and thus a great deal of care must be used in the mixing control of the foam. In order to obtain elastomeric polyurethanes, between 15–40 parts of diisocyanate must be used with 100 parts of polyester.

Polyesters suitable for reaction with diisocyanate include linear polyesters terminating in hydroxyl groups and having a moderate molecular weight.

Vinyl resins incorporating a foaming agent may also be used as a filler for my invention. When using vinyl foams, an open mold may be preferred. A suitable web may be coated with vinyl dispersions containing a foaming agent and the foam allowed to expand. While the vinyl foam requires no application or pressure, it does require curing at 330° F. Some vinyl resins which may be used for this purpose include polyvinyl chloride and polyvinylidene chloride.

The present invention is a good construction material for air-supported buildings. It offers good thermal insulation properties. The material may be formed as described in this invention or two sheets of material described in the parent application, Serial No. 367,317, filed July 10, 1953, may be formed into the desired shape, inflated and elastomeric foam injected therebetween; the two sheets having spaces therebetween to permit uniform foam thickness.

Where acoustical properties are desired, solid particles having a specific gravity higher than that of the fibers or of the foamed plastic and being of non-uniform particle size are incorporated in the foamable composition. When the resultant material is impinged on by longitudinal vibrations such as in sound, the particles will set up vibrating foci and because of the differential amplitude of swinging between the different particles when suspended in the plastic foam walls, stresses will be set up in the foam walls and the plastics in the foam will act to convert the sound energy to thermal energy due to the hysteresis effect; the thermal energy then being dissipated by the radiation and conduction from the plastic film.

Particles having a specific gravity above 2.5 are preferred or a specific gravity considerably higher than that of the plastic employed. The particles should be of non-uniform particle size and weight so that the amplitudes and swinging characteristics of the various particles on impingement of sound waves will be as different as possible. The particle size should vary between 20 and 500 mesh. Materials which can be used include zinc, tin, lead, stainless steel grit and shot and brass dust.

*Example 1*

A sheet of black polyethylene (carbon impregnated polyethylene) and a sheet of duck (18.002/ sq. yd. vinyl coated duck base canvas 9.5 oz./sq. ft.) are each coated with a resin made by mixing 100 parts by weight polyvinyl chloride with 100 parts by weight dioctyl phthalate (plasticizer), 20 parts diethylene glycol dibenzoate, 3 parts by weight dibasic lead phthalate, .5 part by weight Porofor-N blowing agent (azobis isobutyric dinitrile produced by the Bayer Company). Unwoven Dacron yarn is then arranged in parallel bundles on each of the two sheets; the threads being so arranged that a rectilinear pattern is formed when the sheets are combined. The sheets are

Example 2

Two sheets of foamed elastomeric polyurethane sheets (¼" thickness) are coated on one surface with an adhesive comprising 100 parts of synthetic butyl rubber, 33 parts of a mixture of two or more chlorinated biphenyls and 200 parts of xylene. Unwoven Dacron yarn is then arranged in parallel bundles on each of the two sheets; the threads being so arranged that a rectilinear pattern is formed when the sheets are combined. The two sheets of foamed elastomeric polyurethane are combined enclosing the grid therein and then the outer surfaces of the foam are coated with the aforementioned adhesive. To one of the adhesive-coated sides of the elastomeric foam is attached a sheet of Mylar (.5 mil thickness) which has been precoated with adhesive and to the other adhesive-coated side of foam is attached a sheet of black polyethylene (1 mil thickness) which has been precoated with adhesive.

The unusually great resistance to ripping which has been found to be exhibited by the material of the invention is due to the combination of adhesive of the permanently tacky kind described, applied to the thickness described, together with fibers having the above described limitations and likewise films specifically as described above and such characteristics are not exhibited by laminates wherein one of the essential elements as set forth herein of the combination is omitted.

The desirable properties of the material are not due to any one nor to most of the elements nor do they increase in proportion as a laminate is made which embraces more and more of the necessary elements of the combination but are found only with the material which has all of the elements and are not found with the material in which any one of the elements is omitted.

It may thus be seen that the invention is broad in scope and is not to be limited excepting by the claims.

Having thus disclosed my invention, I claim:

1. An article comprising two films of non-elastomeric flexible polymeric synthetic resin characterized by having an elongation of at least 20% before tensile failure, at least one grid of fibers interposed between said films to provide tear resistance, at least one layer of elastomeric flexible polymeric foam material interposed between said films and adherent thereto, and a layer of adhesive between each of said films and the adjacent layer of said elastomeric foam material, said grid of fibers disposed within a layer of said adhesive.

2. The article of claim 1 wherein two layers of elastomeric flexible polymeric foam material are provided between said films and a layer of adhesive is provided between each of said films and the respectively adjacent layer of elastomeric foam material and between said layers of elastomeric flexible polymeric foam material.

3. An article comprising two films of non-elastomeric flexible polymeric synthetic resin characterized by having an elongation of at least 20% before tensile failure, means interposed between said films to provide tear resistance comprising a grid of fibers and a layer of elastomeric flexible polymeric foam material interposed between said films and adherent thereto, a layer of adhesive between said elastomeric foam material and said films, said fibers being slidable both lengthwise and sidewise in a layer of said adhesive.

References Cited in the file of this patent

UNITED STATES PATENTS

| | | |
|---|---|---|
| 2,324,735 | Spanel | July 20, 1943 |
| 2,540,906 | Overton et al. | Feb. 6, 1951 |
| 2,626,886 | Scholl | Jan. 27, 1953 |
| 2,708,177 | Fries et al. | May 10, 1955 |
| 2,719,804 | Carlson | Oct. 4, 1955 |
| 2,728,702 | Simon et al. | Dec. 27, 1955 |
| 2,772,993 | Magnuson | Dec. 4, 1956 |
| 2,780,090 | Rasmussen | Feb. 5, 1957 |
| 2,841,515 | Runton | July 1, 1958 |